UNITED STATES PATENT OFFICE.

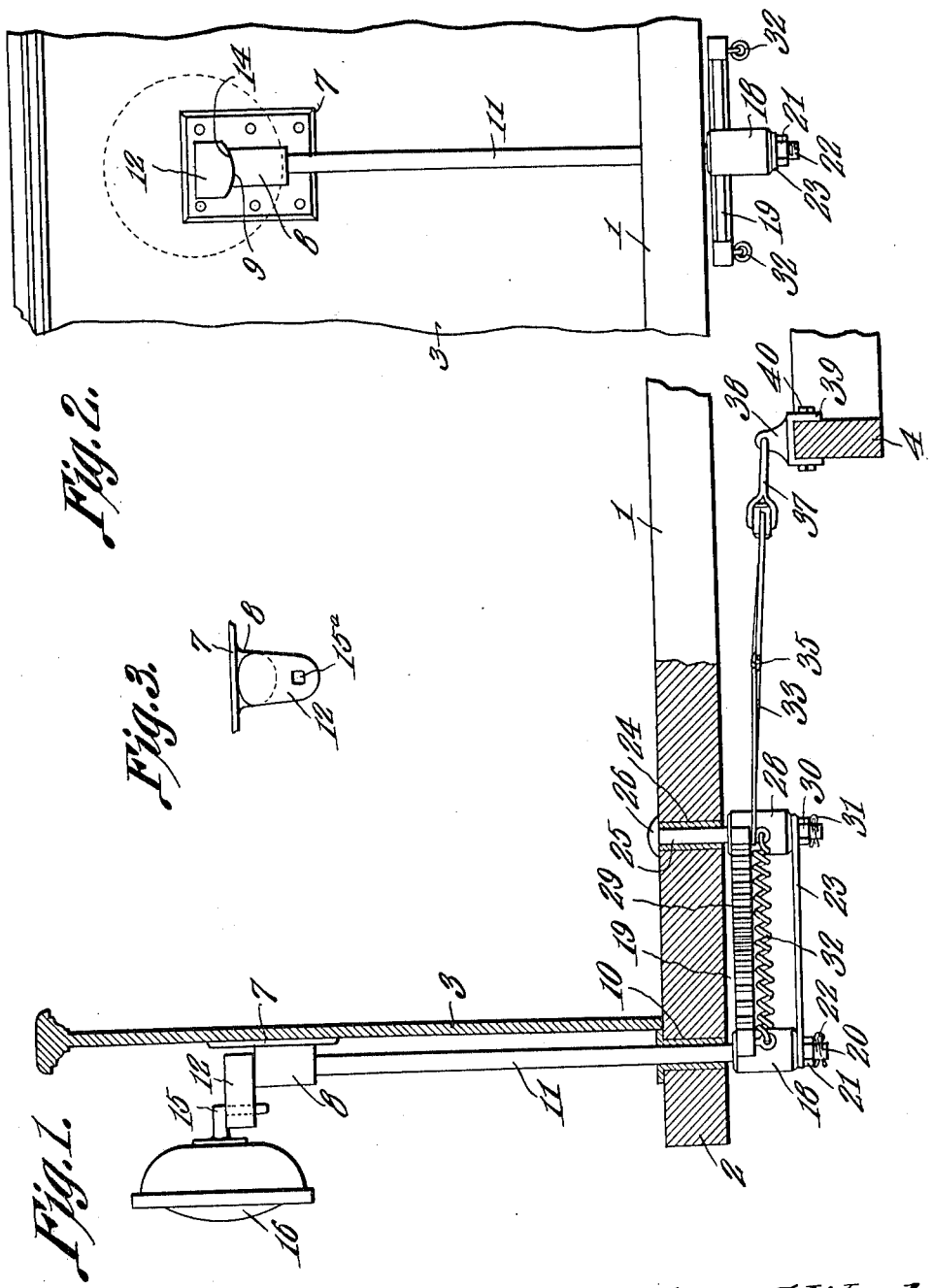

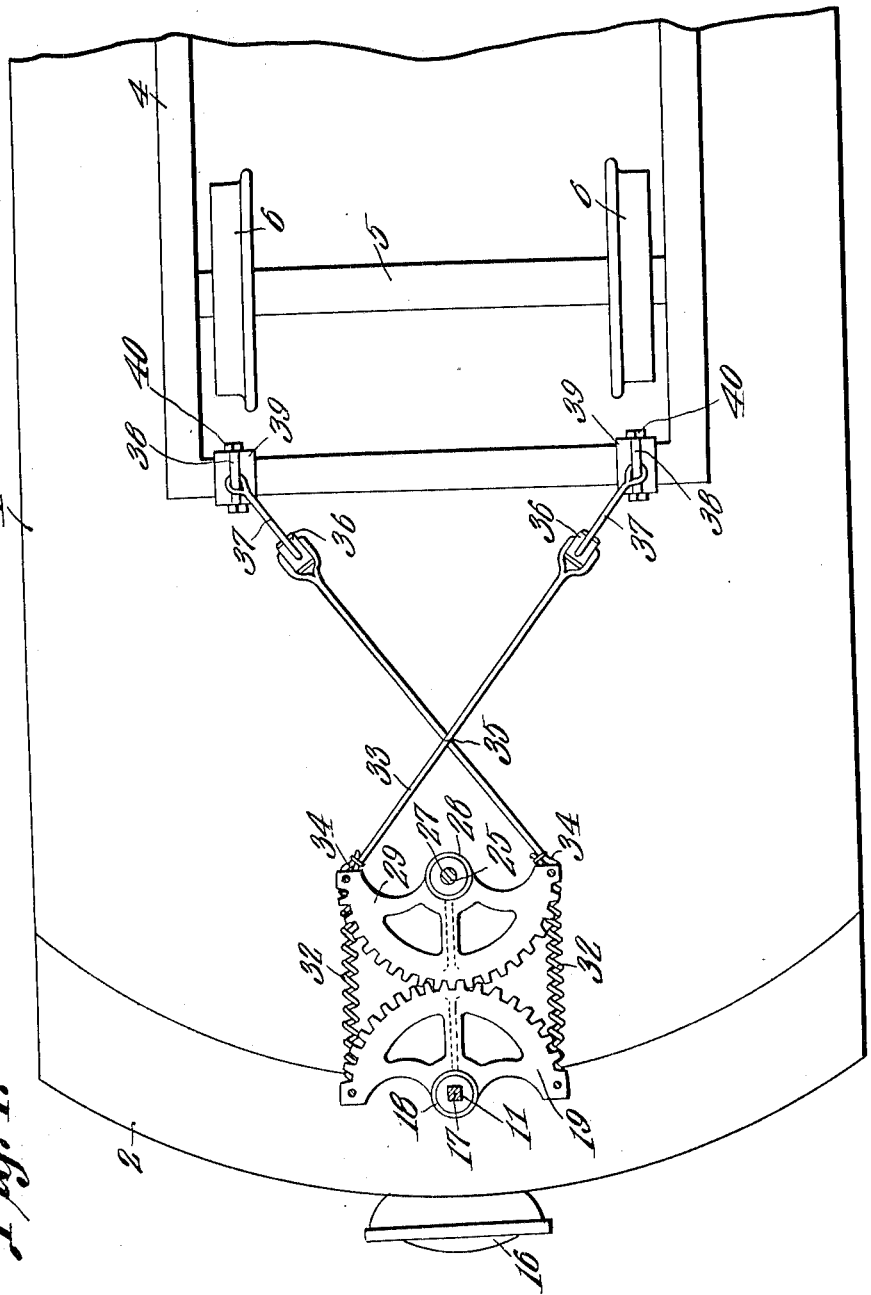

WILLIAM C. WENTZ, OF MARINE, ILLINOIS.

HEADLIGHT-ACTUATOR.

1,090,262.  Specification of Letters Patent.  Patented Mar. 17, 1914.

Application filed September 19, 1913. Serial No. 790,709.

*To all whom it may concern:*

Be it known that I, WILLIAM C. WENTZ, a citizen of the United States, residing at Marine, in the county of Madison and State of Illinois, have invented a new and useful Headlight-Actuator, of which the following is a specification.

The device forming the subject matter of this application is an attachment adapted to be applied to a car or other vehicle, for the purpose of controlling the head light, when the vehicle rounds a curve, the construction being such that the head light will be turned, automatically, to follow the curve.

One object of the present invention is to provide novel means for operatively connecting the lamp actuating shaft with the truck of the vehicle.

Another object of the invention is to provide a device of the type above indicated in which there will be a minimum amount of lost motion.

The invention aims further to provide a device of the sort mentioned in which short-circuiting and shocks will be prevented.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows the invention in side elevation, a part of the supporting structure of the car being in section; Fig. 2 is a front elevation, parts being removed; Fig. 3 is a top plan of the supporting bracket and the lamp actuating shaft which is carried thereby; Fig. 4 is a bottom plan, parts being sectioned and removed.

In the accompanying drawings, a portion of a car is shown, the same comprising a platform 1, a bumper 2, a dashboard 3, and a pivotally mounted truck frame 4 supporting an axle 5, the latter carrying wheels 6. The foregoing elements constitute no part of the present invention, saving in so far as they may enter into combinations, and need not be specifically described.

Attached to the forward face of the dashboard 3 is a supporting plate 7 provided with an outstanding socket 8, the upper edge of which is concaved as indicated at 9. Mounted in the bumper 2 is a bushing 10. Journaled for rotation in the bushing 10 and in the socket 8 is a lamp actuating shaft 11, provided at its upper end with a forwardly presented arm 12 the lower edge of which is convexed as indicated at 14, to conform to the concavity 9 of the socket 8. The concavity 9 and the convexity indicated at 14 may be referred to as a means for maintaining the lamp releasably in a forwardly presented position, and the socket 8 and the arm 12 may be referred to as coöperating elements. In the arm 12 of the shaft 11 there is a polygonal opening 15ª adapted to receive against rotation, an arm 15 formed upon and secured to a lamp 16 of desired sort.

As shown probably to best advantage in Fig. 4, the lower end of the lamp actuating shaft 11 is squared as indicated at 17 to receive, against relative rotation, the hub 18 of a rearwardly extended toothed segment 19. The lamp actuating shaft 11 terminates at its lower end in a circular, threaded tip 20, receiving a nut 21 held in place by a cotter pin 22. The function of the elements last above specified, obviously, is to hold the segment 19 in place on the lower end of the shaft 11. The tip 20 of the shaft 11 passes through the forward end of a connecting plate 23, the same being located between the nut 21 and the lower end of the hub 18.

Mounted in the platform 1 of the car or otherwise supported is a bearing 24 receiving a shaft 25 which may be in the form of a bolt having a head 26 resting upon the upper end of the bearing 24. As shown at 27 in Fig. 4, the shaft or bolt 25 is circular, to receive for rotation, the hub 28 of a forwardly presented segment 29 which meshes into the segment 19. A nut 30 is applied to the lower end of the shaft 25 and is held in place by a cotter pin 31. The bolt or shaft 25 passes through the rear end of the connecting plate 23. Retractile springs 32, preferably of helical form, connect the ends of the segments 29 and 19.

Flexible elements 33 are secured as indicated at 34, to the rear portions of the segment 29, the flexible elements 33 being crossed upon themselves as indicated at 35. The flexible elements 33 may be referred to as crossed, intersecting members. The flexible elements 33 are thoroughly and adequately insulated, and their rear ends are looped through or otherwise engaged with, insulators 36, connected by means of links 37 with fins 38 projecting from saddles 39 held in place on the truck frame 4 by means of set screws 40.

In practical operation, motion will be transmitted to the segment 29 by means of one or the other of the flexible elements 33, depending upon the direction in which the truck frame 4 moves as the wheels 5 traverse the curve. From the segment 29, motion will be transmitted to the segment 19 and thence into the shaft 11, the arm 12 being moved to swing the lamp 16, so that the lamp will follow the curve which the car or vehicle is rounding.

The shaft 11 not only rotates in the socket 8, but as well, has a slight longitudinal movement therein. This longitudinal movement is necessary in order to permit the convexed lower edge 14 of the arm 12 to coöperate properly with the concaved upper edge 9 of the socket 8.

Owing to the interacting relation existing between the elements above mentioned, it will be seen that under normal conditions when the vehicle or car is moving along a straight track, the lamp 16 will be forwardly presented, and a lateral movement of the lamp will be avoided. In this connection, the springs 32 are of importance, and it is to be noted, further, that the springs tend to compensate for any lost motion existing between the intermeshing teeth of the segments 19 and 29. Through the medium of the springs 32, the segments 19 and 29 are maintained in mesh, and the connecting plate 23 exercises a like function.

In devices of this type, considerable difficulty has been experienced hitherto, due to short-circuiting. This undesirable feature is obviated by reason of the fact that the flexible elements 33 are thoroughly insulated, and for the further reason that the insulators 36 are interposed between the flexible elements 33 and the links 37.

The device herein disclosed although simple in construction and comprising few parts, will be found thoroughly adequate for the ends in view.

It is to be noted that the segments 29 may be moved along the forward portion of the truck frame 4, and be held in their adjusted positions by means of the set screws 40. This adjustment is of great importance in securing an adequate and efficient working of the structure.

Having thus described the invention, what is claimed is:—

1. In a device of the class described, a support; a pair of intermeshing segments carried by the support; retractile springs connecting the segments upon opposite sides of their place of intermeshing; a lamp actuating shaft operatively connected with one segment; intersecting crossed members each connected at one end with the other segment; and truck engaging means connected with the other ends of the crossed members.

2. In a device of the class described, a support; a pair of shafts carried by the support, one shaft being a lamp actuating shaft; intermeshing segments carried by the shafts; means for actuating one segment; and a connecting member uniting the shafts and supported solely by the shafts.

3. In a device of the class described, a support; a pair of shafts carried by the support; one shaft being a lamp actuating shaft; intermeshing segments carried by the shafts; means for actuating one segment; a connecting member uniting the shafts and supported solely by the shafts; and retractile springs connecting the segments.

In testimony that I claim the foregoing as my own, I have hereto affixed my signature in the presence of two witnesses.

WILLIAM C. WENTZ.

Witnesses:
  N. C. LYRLA,
  H. H. ELDREDGE.

---

Copies of this patent may be obtained for five cents each, by addressing the "Commissioner of Patents, Washington, D. C."